United States Patent
Zorge et al.

(10) Patent No.: US 6,355,218 B1
(45) Date of Patent: Mar. 12, 2002

(54) CRYSTALLIZER WITH COOLING ELEMENT AND SWEEPING ELEMENT WITH SWEEPING PARTS, AND SWEEPING ELEMENT AND SWEEPING PART FOR SUCH A CRYSTALLIZER

(75) Inventors: Rene Jan Zorge, Gouda; Albertus Nicolaas De Moet, The Hague; Theodorus Gijsbertus Ravensberg, Boskoop, all of (NL)

(73) Assignee: Goudsche Machinefabriek B.V. (NL)

( * ) Notice: Subject to any disclaimer, the term of this patent is extended or adjusted under 35 U.S.C. 154(b) by 0 days.

(21) Appl. No.: 09/522,983

(22) Filed: Mar. 10, 2000

(51) Int. Cl.$^7$ ................................................. B01D 9/00
(52) U.S. Cl. ................. 422/254; 422/245.1; 422/250.1; 422/251
(58) Field of Search ............................ 422/245.1, 250.1, 422/251, 254; 23/296

(56) References Cited

FOREIGN PATENT DOCUMENTS

EP    0 031 134 A 2    7/1981

Primary Examiner—Felisa Hiteshew
(74) Attorney, Agent, or Firm—Chadbourne & Parke

(57) ABSTRACT

A crystallizer comprising an elongate housing with a drivable shaft extending in the longitudinal direction of the housing, at least one cooling element being placed astride on the shaft, which cooling element to that end has a slotted recess, the cooling element being swept clean by a sweeping element rotating along with the shaft. The sweeping element comprises a shaft part which is mounted on the shaft so as to extend substantially radially and rotate along with the shaft and which carries a sweeping part rotatable about the axis of the shaft part, which sweeping part is provided with at least one sweeping arm but preferably carries four sweeping arms which extend radially relative to the shaft part and enclose equal angles relative to each other, the sweeping element being mounted on the shaft such that, viewed in the direction of displacement thereof, the free end of a sweeping arm is disposed in leading position with respect to the shaft part in a push-scraping position pressed against the cooling element.

13 Claims, 2 Drawing Sheets

CRYSTALLIZER WITH COOLING ELEMENT AND SWEEPING ELEMENT WITH SWEEPING PARTS, AND SWEEPING ELEMENT AND SWEEPING PART FOR SUCH A CRYSTALLIZER

BACKGROUND OF THE INVENTION

This invention relates to a crystallizer comprising an elongate housing having two ends, an elongate trough-shaped part located between the ends, and supply means and discharge means adjacent the ends, while in the longitudinal direction of the housing extends a drivable shaft on which and over which at least one stationary box-shaped cooling element is placed which comprises a back wall and a front wall interconnected by a transverse wall and is provided with a slotted recess for placing the cooling element astride on and over the shaft, the front wall and the back wall each being swept by a sweeping element rotating along with the shaft.

Such a crystallizer is known from EP-A-0 031 134. The crystallization of the solution being passed through the crystallizer takes place through cooling by means of the cooling elements. A problem presenting itself here is that crystals which have formed proceed to adhere to the cooling elements and thereby adversely affect optimum crystallization. To prevent crystal caking and consequent encrustation, sweeping elements have been fitted which are to keep the surface of the front and back wall of the cooling elements clean. By having the sweeping elements rotate along with the shaft, which may carry further compartmenting elements, the front and back wall are scraped clean. Although scraping in a pushing manner (hereinafter also referred to as 'push-scraping') would be preferable, scraping is done in a pulling manner (hereinafter also referred to as 'pull-scraping') due to the slotted recess provided in the cooling element to enable it to be fitted astride the shaft. If scraping were done in a pushing manner, the scraping edge of the sweeping part, after leaving the wall surface of the cooling element at the recess, would butt against the edge on the other side of the recess, and then, after being bent over to a considerable extent, proceed to scrape in a pulling manner again after all.

The object of the invention is to improve a crystallizer with cooling elements and sweeping elements of the type described in the opening paragraph hereof, such that scraping can be done in a pushing manner.

SUMMARY OF THE INVENTION

This is achieved in accordance with the invention if the sweeping element comprises a shaft part which is mounted on the shaft so as to extend substantially radially and rotate along with the shaft and which carries a sweeping part rotatable about the axis of the shaft part, which sweeping part is provided with at least one sweeping arm which extends substantially radially relative to the shaft part and has a free end edge which by springing means can be brought into a push-scraping contact with the adjacent front or back wall of the cooling element, and which, when leaving the respective wall upon reaching the slotted recess, together with an adjacent part of the sweeping element, springs into that recess, the sweeping part being bearing-mounted on the shaft part for rotation such that the sweeping part, as a result of the sweeping arm butting against an edge of the recess, can rotate about the shaft part until a free end edge of a sweeping arm is springingly disposed in a push-scraping contact with the respective wall again. Thus, the butting of the sweeping arm against the edge of the recess, which has heretofore made push-scraping impossible, has been advantageously and surprisingly utilized to accomplish precisely such push-scraping by converting the sweeping arm's being, as it were, hooked in the recess into a swiveling movement of the sweeping part about the shaft part, so that the wall portion of the cooling element contiguous to the recess can be approached again from above by a sweeping arm and thus can be scraped clean again with a pushing sweeping arm.

If use is made of one sweeping arm for each sweeping element, the couple generated by the forced swiveling of the sweeping part about the shaft part as a result of the further rotation of the sweeping part while the sweeping arm in the recess remains in contact with the edge of that recess and continues to slide along that edge until the free end edge can be pulled onto the wall portion of the cooling element adjacent to the recess, can be accumulated to bring about, upon termination of the forced swiveling, the further rotation of the sweeping part into the push-scraping position. This is possible, for instance, by storing the couple referred to in a spring motor, or tensioning a spring using a cam track. This operation is rendered simpler if the sweeping part carries two diametrically opposite sweeping arms, while, as a result of one sweeping arm lagging in the recess, the other sweeping arm is brought to its push-scraping position. However, according to a further embodiment of the invention, it is preferred that the sweeping element is provided with at least three sweeping arms extending substantially radially relative to the shaft part while enclosing substantially equal angles relative to each other, and is mounted on the shaft such that in each case two adjacent sweeping arms can press simultaneously and scrapingly against the adjacent wall of the cooling element. Upon taking these measures, when the wall surface is being scraped clean, there will be a leading sweeping arm which scrapes in a pushing manner and a trailing sweeping arm which scrapes in a pulling manner, with both sweeping arms being resiliently pressed against the wall surface. Due to the contact of the two sweeping arms with the wall surface, the sweeping part is restrained from rotation about the shaft part. When the leading arm reaches the recess, it will spring into the recess, whereby the restraint from rotation is removed. When subsequently the leading arm at the end of the recess butts against the edge thereof, the sweeping part will swivel about the shaft part until the previously inactive sweeping arm adjacent to the push-scraping sweeping arm comes into contact with the wall surface. The hitherto leading sweeping arm is thereupon pulled onto the cooling element, thereby restoring a situation where two sweeping arms are springingly pressed onto the wall surface and rotation is blocked. Thus, there is again a leading, push-scraping sweeping arm and a trailing, pull-scraping sweeping arm, with the understanding, however, that the initially leading sweeping arm is now the trailing sweeping arm and the initially trailing sweeping arm has been brought into an inactive position, this without involving supplemental swiveling mechanisms with power storage as described in relation to the use of one or two sweeping arms.

Pressing the sweeping arm against the wall surface of the cooling element can be done in various ways. For instance, it may be provided that each sweeping arm, starting from the shaft part, has a radially extending portion which merges adjacent the free end into a portion bent in the sense of rotation of the shaft. Since the sweeping part is moved through the solution to be crystallized, a pressure will be exerted on it, which will be greater on the, as it were, scoop-shaped push-scraping sweeping arm than on the adjacent inactive sweeping arm whose bent portion guides the solution moving along it in a more flowing manner, which results in a press-on force on the push-scraping sweeping arm, which press-on force keeps that sweeping arm in contact with the wall surface of the cooling element.

However, the springing pressing-on of the sweeping arms can also be realized, in a simple yet highly effective manner, if according to a preferred embodiment of the invention the sweeping element is non-slidably mounted on the shaft and the sweeping arms can yield resiliently, while the distance of the axis of the shaft part to an adjacent wall of the cooling element is smaller than the distance of that axis to the imaginary connecting line between the free ends of two adjacently arranged sweeping arms in the condition of the sweeping element when not mounted on the shaft. Thus both the scraping and the tilting effect are ensured.

According to another embodiment of the invention, this can also be realized if the sweeping element is mounted on the shaft to be springingly slidable, such that the sweeping arms are pressed against the adjacent wall of the cooling element. In this case, use can be made of sweeping parts with sweeping arms which spring or which hardly spring, i.e., are made of relatively rigid or hard material.

The latter sweeping arms have the advantage that they have a better scraping action than sweeping arms made of a material generating more friction, for instance rubber. To accomplish such better scraping action in springing sweeping parts as well, it is preferred, in accordance with a further embodiment of the invention, that in that type of sweeping parts each sweeping part is provided with an elastically springing base part which carries at least three relatively rigid and hard sweeping arms.

During scraping, a thrust wave may form in front of the sweeping arm, so that the boundary layer on the wall surface is less disturbed than is desirable to obtain optimum heat transfer. For this reason, it is preferred, in accordance with a further embodiment of the invention, that the free end of each sweeping arm is provided with a beveled surface in leading position as viewed in the direction of rotation, which surface provides for improved removal along the sweeping arm and thereby improves heat transfer between the solution to be crystallized and the cooling element.

The invention further relates to a discrete, loose sweeping element to be used in a crystallizer as intended hereinabove, which sweeping element to that end preferably comprises a shaft part provided at one end with mounting means for the shaft part to be mounted on a shaft so as to extend radially, and carries a freely rotatable sweeping part: which is provided with at least three, preferably four, sweeping arms which extend substantially radially relative to the shaft part. The mounting means may then be so designed that the sweeping element can be mounted on the shaft both rigidly and for springing sliding movement.

Further, the invention also relates to a discrete, loose, sweeping part to be used in a crystallizer or sweeping element as intended hereinabove, which sweeping part to that end preferably comprises a base part of an elastically springing material rotatably mountable on a shaft part, and at least three, preferably four, sweeping arms of a relatively rigid and hard material. It is also possible that the sweeping part comprises a base part rotatably mountable on a shaft part, and at least three, preferably four, sweeping arms each having, starting from the base part, a radially extending portion which merges adjacent the free end into a bent portion.

Referring to exemplary embodiments represented in the drawings, the crystallizer with cooling elements and sweeping elements with sweeping parts according to the invention will presently, though by way of example only, be further discussed. In the drawings:

DETAILED DESCRIPTION OF THE DRAWINGS

Figure 1:
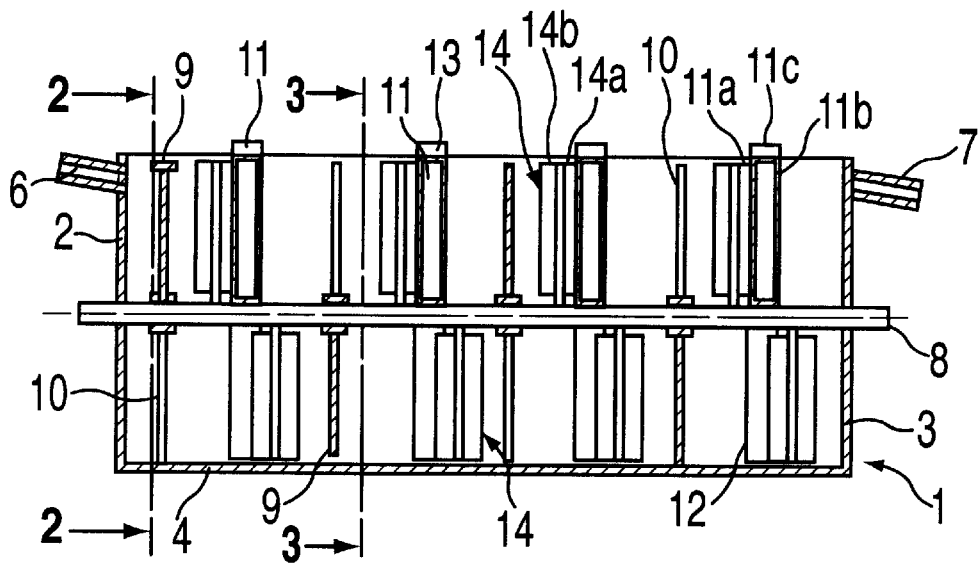
FIG. 1 shows a cross section of a crystallizer according to the invention.

The crystallizer represented in the drawing comprises a housing 1 with a front end wall 2, a rear end wall 3 and, extending between the walls 2 and 3, an elongate trough shaped part 4 which in cross section has a U-shaped configuration with vertical leg parts 4a and 4b, and, interconnecting these leg parts, a semi-cylindrical bottom part 4c. Bottom supports 5 provide for a stable arrangement of the housing 1. At the front end wall 2, the housing 1 is provided with a supply 6 for a solution to be crystallized, while at the rear end wall 3 a discharge 7 for that solution is arranged.

Figure 2:
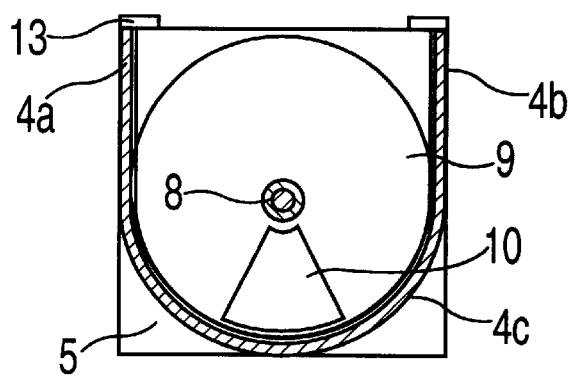
FIG. 2 shows a cross section along the line II—II in FIG. 1.

In the housing 1, in the longitudinal direction of the trough-shaped part 4, a shaft 8 is mounted, which is rotatable by means not shown and whose axis coincides with that of the semi-cylindrical bottom part 4c. Extending perpendicularly to the shaft 8, a number of circular disc elements 9 are non-rotatably fitted on that shaft 8. Each disc element 9, as appears most clearly from FIG. 2, is provided with a recess 10, the successive disc elements 9 being mounted on the shaft 8 such that the recesses 10 in adjacent disc elements 9 are not in alignment.

Figure 3:
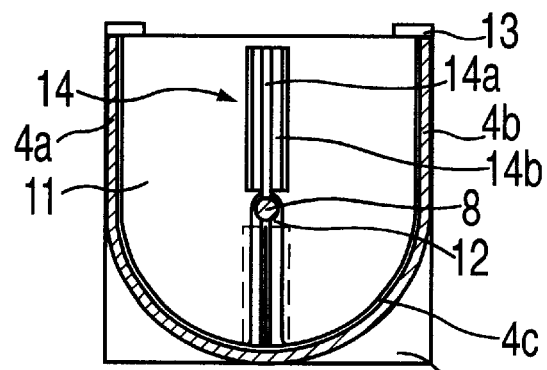
FIG. 3 shows a cross section along the line III—III in FIG. 1.

Situated between pairs of disc elements 9 is a cooling element 11, which extends perpendicularly to the shaft 8 and is made up of a front wall 11a, a back wall 11b, and a circumferential transverse wall 11c joining walls 11a, 11b to form a hollow, box-shaped whole. The front wall 11a and the back wall 11b have a substantially U-shaped form, whose outer circumference is adapted to that of the trough-shaped part 4. As appears most clearly from FIG. 3, to enable a cooling element 11 to be fitted in and removed from the trough-shaped part 4, a slot 12 is provided centrally and radially, starting from the round underside, to enable the cooling element 11 to be fitted astride the shaft 8. The transverse wall 11c follows the outer circumference of the slot 12 to maintain the closed, box-shaped configuration. When the cooling element 11 is being fitted into the trough-shaped part 4, it is stopped by way of ears 13 which are stopped upon engaging the top of the leg parts 4a and 4b, the arrangement being such that the cooling element does not contact the shaft 8.

Further, on the shaft 8 a number of sweeping elements 14 are fitted, each comprising a shaft part 14a and a sweeping part 14b. The shaft parts 14a are fixedly connected to the shaft 8 at such a point that the sweeping parts 14b are pressed against the front and back wall 11a and 11b of each cooling element 11. Thus the front wall and the back wall 11a and 11b are kept free from encrustations by the sweeping elements 14 when the shaft 8 is rotated.

The operation of the crystallizer is as follows. A solution virtually saturated at a particular temperature is introduced into the housing 1 through the supply 6. The housing 1 will be filled until the housing 1, throughout the length of the trough-shaped part 4, is filled up to the level of the discharge 7, with the solution passing the rotary disc elements 9 through the recesses 10 and passing the cooling elements 11 through the slots 12. Together with the disc elements 9, the sweeping elements 14 rotating along have a transporting and stirring function. The virtually saturated solution, upon contacting the front wall 11a of the first cooling element 11, is cooled off, so that crystallization occurs in the liquid. The cooling elements 11 in succession have a progressively lower temperature, ensuring that the crystallization process continues as the solution is being passed through the crystallizer, so that at the discharge 7 the desired degree of crystallization has been achieved.

As already mentioned, crystals have a tendency to adhere to a surface. Such encrustation in situ on the cooling elements 11 is prevented by the sweeping elements 14 scraping over the surface of the front and back wall 11a and 11b. The scraping action of the sweeping elements 14 is then most effective if scraping is done in a pushing manner. This manner of scraping will be elucidated with reference to FIG. 4, which shows a cooling element 11 with a slot 12 in bottom view. A sweeping element 14 fitted with four sweeping arms a, b, c, d is represented in position 14.1 in scraping contact with the wall surface of the cooling element 11. This situation is comparable with the position of the sweeping arms in the upper half of FIG. 1. The displacement of the sweeping element over the cooling element is designated by arrow P. The sweeping arm a of sweeping element 14 thus reaches in the direction of displacement and will have a push-scraping action. The sweeping arm d of sweeping element 14 has a trailing, pull-scraping action. As mentioned hereinabove, a sweeping element 14 comprises a shaft part 14a and a sweeping part 14b. The sweeping part 14b is mounted on the shaft part 14a so as to be freely rotatable. In the position 14.1 of the sweeping part represented in FIG. 4, such free rotation is blocked by the sweeping arms a and d springingly pressing against the cooling element 11, this pressing action having been accomplished by suitably fixing the sweeping element 14 on the shaft 8 relative to the cooling element 11.

Figure 4:
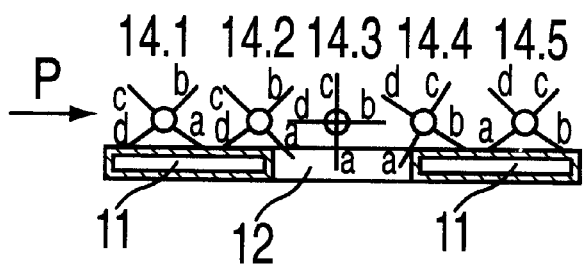
FIG. 4 schematically shows the tilting of a sweeping part.

The position 14.2 represented in FIG. 4 shows what happens when the sweeping element reaches the recess or slot 12. The sweeping arm a springs into that recess. The restraint from rotation is thereby removed, and the sweeping arm d will also spring outwards while the sweeping element is rotated further. The extent of rotation is not defined, nor is it essential; it is presumed that the sweeping element ends up in the position designated by 14.3 in FIG. 4, which position is comparable to that indicated in the lower half of FIG. 1. Further displacement of the sweeping element causes the sweeping arm a to butt against the edge of the slot 12, so that the sweeping element rotates into the position designated by 14.4 in FIG. 4, where the sweeping element has rotated so far that the initially inactive sweeping arm b has its scraping edge coming into contact with the wall surface of the cooling element 11. Further displacement of the sweeping element results in the sweeping arm a being pulled onto the wall surface of the cooling element, yielding the position 14.5, which is basically identical to position 14.1, except that presently the sweeping arm b has a push-scraping action, the sweeping arm a has a pull-scraping action, and the sweeping arm d is no longer active. Thus, push-scraping is continued despite the presence of the recess or slot 12.

It will be clear that upon subsequently passing the slot 12 again, the sweeping element will rotate further through a quarter of a turn in a manner similar to that described above.

Figure 5:
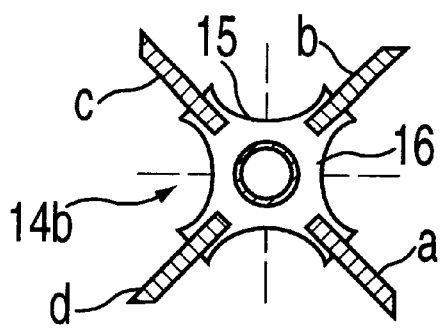
FIG. 5 shows in cross section an embodiment of the sweeping part.

FIG. 5 shows on an enlarged scale a possible embodiment of a sweeping part 14b, which comprises a bearing sleeve 15 on which a base part 16 of rubber or a similar elastic material has been vulcanized or secured in a similar manner. The base part 16 comprises four longitudinal ribs for receiving and fixing four sweeping arms a–d of a relatively hard and rigid material, which are provided at their free ends with a beveled scraping surface, which is situated in the direction of displacement such that scraped material can be removed in a smoothly flowing manner.

Figure 6:
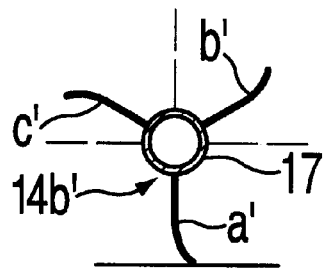
FIG. 6 shows in cross section a second possible embodiment of the sweeping part.

FIG. 6 shows an alternative embodiment 14b' of a sweeping part, provided with a base part in the form of a bearing sleeve 17 on which three relatively rigid, for instance metal, sweeping arms a', b' and c' are secured. Each sweeping arm a'–c', starting from the bearing sleeve 17, first has a virtually radial portion, which then merges into a portion bent in the direction of displacement, so that the scraping edge can act in a pushing manner. This sweeping part 14b' being pressed against the wall surface of the cooling element is partly effected by the pressure of the solution through which the sweeping arm is being moved. Because in a vertical sense the height of the sweeping arm a' is greater than that of the sweeping arm b', a resultant force will arise which presses the sweeping arm a' against the wall surface of the cooling element.

Figure 7:
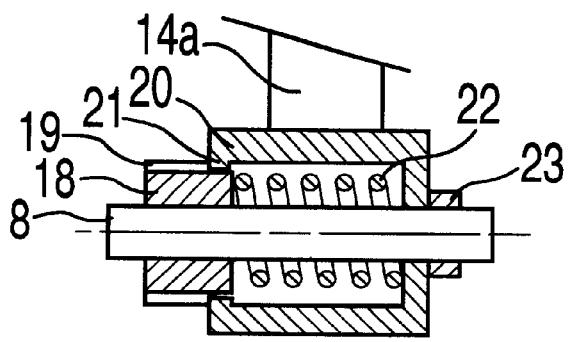
FIG. 7 shows a construction detail of a further possible embodiment of a sweeping part

Instead of fixedly securing the sweeping element on the shaft 8, a springing arrangement can be opted for. To that end, use can be made of the construction shown in FIG. 7. On the shaft 8 a bush 18 with a key toothing 19 is mounted. On the shaft 8, further, a cup-shaped bush 20 is slidably mounted, having at its free end a key toothing 21 which can slidably cooperate with the key toothing 19. Present in the bush 20 is a compression spring 22 supported at one end against the bottom of the bush 20 and at the other end against the side of the bush 18. The displacement of the bush 20 in the expanding direction of the spring 22 is limited by a stop ring 23. The bush 20 further carries the shaft part 14a of a sweeping element 14. In this way, a proper springing pressing-on of the sweeping element is also possible when using relatively rigid and hard sweeping arms without resilient base part.

It will be understood that within the framework of the invention as set forth in the appended claims, many modifications and variants are possible. Although in the exemplary embodiments reference is made to three or four sweeping arms, a sweeping element may also carry one or two sweeping arms, as already discussed, in which case during the forced swiveling movement, when a sweeping arm in the recess abuts against the edge thereof, a power accumulator is charged to complete the swiveling movement upon termination of the forced part thereof. Obviously, each sweeping arm may comprise five or more arms. Parts of the cooling elements that cannot be reached by a sweeping element, for instance the transverse wall in the recess and, viewed in FIG. 3, the top angle areas, can, if so desired, be provided with a cooling provision to prevent encrustation, as discussed in Dutch patent 1006181, also in applicant's name. To enhance the clean-sweeping, transporting and stirring effects, each front or back wall of a cooling element may be swept by more than one sweeping element 14, For a proper temperature control, it will typically also be preferred to cover the trough-shaped housing 1 with a cover and optionally provide it with a further insulating encasing. It is also possible to provide the disc elements 9 with more than one recess and with differently shaped recesses. Also, the U-shaped configuration of the housing, although advantageous, is not of essential importance. That housing could also have a rectangular cross section, and so could the cooling elements, if desired. Further, the sweeping elements can be designed in any other suitable and desired manner, both with regard to the material or combination of materials used, and with regard to the shape of the constituent parts. If desired, sweeping elements cooperating with the disc elements then arranged stationarily, could be present, which sweeping elements are provided with sweeping arms of a length equal to the radial length of the openings in the disc elements.

What is claimed is:

1. A crystallizer comprising an elongate housing having two ends, an elongate trough-shaped part located between the ends, and supply means and discharge means adjacent the ends, while in the longitudinal direction of the housing extends a drivable shaft on which and over which at least one stationary box-shaped cooling element is placed which comprises a back wall and a front wall interconnected by a transverse wall and is provided with a slotted recess for placing the cooling element astride on and over the shaft, the front wall and the back wall each being swept by a sweeping element rotating along with the shaft, wherein the sweeping element comprises a shaft part which is mounted on the shaft so as to extend substantially radially and rotate along with the shaft and which carries a sweeping part rotatable about the axis of the shaft part, which sweeping part is provided with at least one sweeping arm which extends substantially radially relative to the shaft part and has a free end edge which by springing means can be brought into a push-scraping contact with the adjacent front or back wall of the cooling element, and which, when leaving the respective wall upon reaching the slotted recess, together with an adjacent part of the sweeping element, springs into that recess, the sweeping part being bearing-mounted on the shaft part for rotation such that the sweeping part, as a result of the sweeping arm butting against an edge of the recess, can rotate about the shaft part until a free end edge of a sweeping arm is springingly disposed in a push-scraping contact with the respective wall again.

2. A crystallizer according to claim 1, wherein the sweeping element is provided with at least three sweeping arms extending substantially radially relative to the shaft part and enclosing substantially equal angles relative to each other, and is mounted on the shaft such that in each case two adjacent sweeping arms can press simultaneously and scrapingly against the adjacent wall of the cooling element.

3. A crystallizer according to claim 1 or 2, wherein the sweeping element is non-slidably mounted on the shaft and the sweeping arms can yield resiliently, the distance of the axis of the shaft part to an adjacent wall of the cooling element being smaller than the distance of that axis to the imaginary connecting line between the free ends of two adjacently arranged sweeping arms in the condition of the sweeping element when not mounted on the shaft.

4. A crystallizer according to claim 1 or 2, wherein the sweeping element is mounted on the shaft so as to be springingly slidable such that the sweeping arms are pressed against the adjacent wall of the cooling element.

5. A crystallizer according to claim 1, wherein each sweeping part is provided with an elastically springing base part which carries at least three relatively rigid and hard sweeping arms.

6. A crystallizer according to claim 1, wherein the free end of each sweeping arm is provided with a beveled surface in leading position viewed in the direction of rotation.

7. A crystallizer according to claim 1, wherein each sweeping part is provided with four sweeping arms.

8. A crystallizer according to claim 1, wherein each sweeping arm, starting from the shaft part, has a radially extending portion which merges adjacent the free end into a portion bent in the direction of rotation of the shaft.

9. A sweeping element suitable for use in a crystallizer according to claim 1, wherein comprising a shaft part provided at one end with mounting means for mounting on a shaft so as to extend radially, and carries a freely rotatable sweeping part which is provided with at least three, preferably four, sweeping arms, which extend substantially radially relative to the shaft part.

10. A sweeping element according to claim 9, wherein the mounting means are designed to enable rigid mounting on the shaft.

11. A sweeping element according to claim 9, wherein the mounting means are designed to enable mounting on the shaft for springing sliding movement.

12. A sweeping part suitable for use in a crystallizer or sweeping element according to claim 1 and provided with a base part of an elastically springing material rotatably mountable on a shaft part and with at least three, preferably four, sweeping arms of a relatively rigid and hard material.

13. A sweeping part suitable for use in a crystallizer or sweeping element according to claim 1 and provided with a base part rotatably mountable on a shaft part, said base part having at least three, preferably four, sweeping arms each having, starting from the base part, a radially extending portion which merges adjacent the free end into a bent portion.

* * * * *